United States Patent [19]

Rothe et al.

[11] 4,064,112
[45] Dec. 20, 1977

[54] PROCESS FOR THE CONTINUOUS PRODUCTION OF HIGH MOLECULAR WEIGHT POLYETHYLENE TEREPHTHALATE

[75] Inventors: Hans Joachim Rothe, Maintal; Helmut Heinze, Frankfurt; Brian D. Whitehead, Friedrichsdorf; Gunther Priepke, Nidderau, all of Germany

[73] Assignee: Zimmer Aktiengesellschaft, Frankfurt, Germany

[21] Appl. No.: 677,503

[22] Filed: Apr. 15, 1976

[30] Foreign Application Priority Data

Dec. 31, 1975 Germany .............................. 2559290

[51] Int. Cl.$^2$ ............................................. C08G 63/26
[52] U.S. Cl. ............................. 260/75 M; 260/75 T
[58] Field of Search ........................ 260/75 M, 75 T

[56] References Cited

U.S. PATENT DOCUMENTS

| | | | |
|---|---|---|---|
| 3,405,098 | 10/1968 | Heighton et al. | 260/75 M |
| 3,544,523 | 12/1970 | Maxion | 260/75 M |
| 3,544,525 | 12/1970 | Balint et al. | 260/75 M |
| 3,634,359 | 1/1972 | Breitschaft et al. | 260/75 M |

*Primary Examiner* — Lucille M. Phynes
*Attorney, Agent, or Firm* — Allegretti, Newitt, Witcoff & McAndrews

[57] ABSTRACT

This invention relates to a process for the continuous production of high molecular weight polyethylene terephthalate by polycondensation in the solid phase wherein granulated, dried polyethylene terephthalate, having an intrinsic viscosity of at least 0.15, is first crystallized and is thereafter subjected to solid state polycondensation.

13 Claims, 1 Drawing Figure

Figure 1:
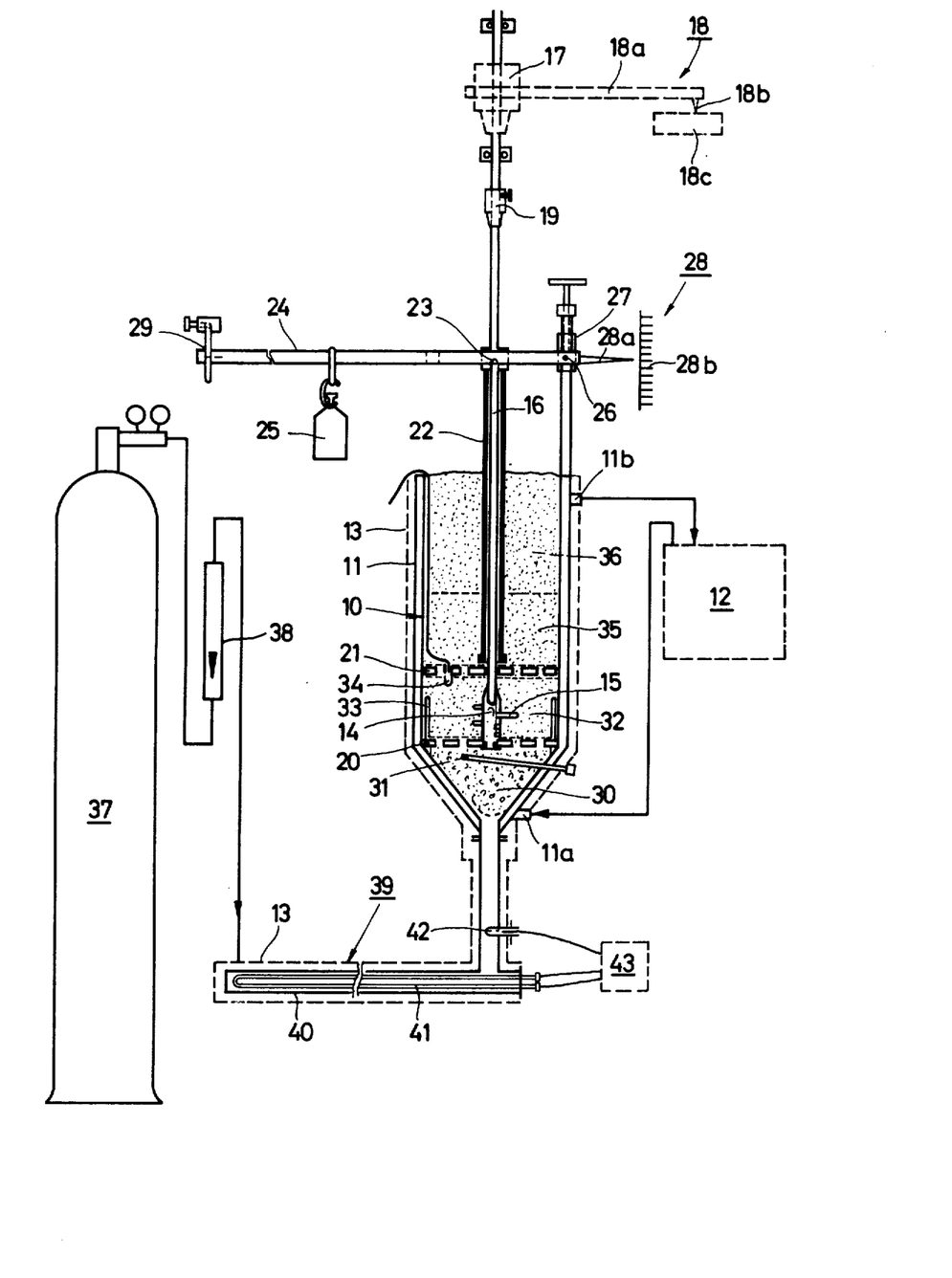

PROCESS FOR THE CONTINUOUS PRODUCTION OF HIGH MOLECULAR WEIGHT POLYETHYLENE TEREPHTHALATE

BACKGROUND OF THE INVENTION

It is known that polyethylene terephthalate may be prepared in the molten state by polycondensation accompanied by liberation of ethylene glycol from prepolycondensates in autoclaves of conventional design. Intrinsic viscosities of approximately 0.7 are usually obtained. Intrinsic viscosities as high as 1.00 can be obtained in specifically designed reactors which improve the evaporation of glycol. These prior art processes have the disadvantage that high reaction temperatures, high catalyst concentrations and long reaction time periods are required to achieve high relative viscosities. The inevitable result is an increasing thermal degradation of the melt which manifests itself by a large number of carboxyl end groups and an intensive yellow coloring of the end product. A high percentage of carboxyl end groups leads to strong signs of degradation during the remelting of the polycondensate. The discolorations are particularly undesirable if pellucid polycondensates are needed for the manufacture of, for instance, packing material for food-stuffs or beverages. In addition, simultaneous with the discoloration, elevated concentrations of aldehydes are to be expected in the melt. These properties are particularly undesirable if the end product is used to manufacture beverage bottles. The aldehydes diffuse into the liquid and affect the flavor of these beverages. Further, such aldehyde containing beverages may be considered to be unfit for human consumption by certain regulatory bodies.

In order to avoid these disadvantages, it is known to produce high viscosity polyesters in the solid phase at temperatures below the melting point of these condensates and under an inert gas blanket or vacuum. The drawbacks of this improvement are the large efforts and expenditure required to prevent the granulate from sticking in the course of the solid state polycondensation.

In one attempted solution to solve this sticking problem, the prior art has subjected the granulate to a continuous mechanically produced movement during the solid state polycondensation. The disadvantage of this prior art process is the need for very long residence time periods for the solid state polycondensation. This requires very expensive reaction equipment with costly agitating elements. In addition, with a continuous process, a very poor residence time spectrum is obtained so that substantial viscosity fluctuations are observed in the finished granulate. This is undesirable for many applications.

Another prior art attempt to solve this stickiness problem is to effect the solid state polycondensation in a fluidized bed in the presence of hot inert gases, such as nitrogen. The necessity of having long residence time periods (which may amount to approximately 20 hours depending on the polycondensability and the molecular weight of the starting material), the desired increase in molecular weight, the particle size of the material, etc., however, requires complicated, expensive equipment and require substantial energy consumption. As in the other prior art processes, the fluidized bed process has an unfavorable residence time spectra. In addition, this fluidized process has the disadvantage of requiring very large quantities of inert gas for fluidization which must be either discarded or subjected to a continous regeneration. This, too, contributes to a very high energy consumption which is, in many cases, not economically justifiable.

In order to avoid agglomerations due to stickiness the prior art has also added the so-called anticaking agents to the surface of the polycondensed granulate. A plurality of substances which range from fluids to solids are already known as anticaking agents and include solutions, dispersions, emulsions etc. In German Provisional Patent Publication No. 2,117,748, silicon dioxide and silicates, for example, are mentioned as solid or pulverous anticaking agents. It is also known to use glass powder as an anticaking agent. In several product applications it is also necessary to remove the anticaking agent from the granulate upon termination of the polycondensation. This is however possible only if the anticaking agents are soluble. Even if the anticaking agent is soluble, it is necessary to dry the granulate prior to the further treatment.

SUMMARY OF THE INVENTION

The invention has, as its basic concept, to providing a process wherein the sticking of the granulate during the solid state polycondensation is reliably prevented by only a small processing effort and without the addition of anticaking agents, while simultaneously avoiding the disadvantages of the known prior art processes. According to the present invention, prior to the start of the solid state polycondensation reaction, the granulate is crystallized to a density of at least 1.390 g/cm3 under forced motion at temperatures of 220° C to 260° C in an inert gas atmosphere. The crystallized granulate is then transferred, at the same temperature or at a lower temperature, while avoiding the addition of air, to a continuously operating, fixed bed reactor where it is polycondensed at a temperature equivalent to, or lower than, the crystallization temperature.

The invention is based on the surprising discovery that the sticking of the granulate during the solid state polycondensation may be completely prevented if the solid state polycondensation is preceded by a crystallization utilizing temperatures which are higher than, or equal to, the temperature at which the solid state polycondensation is effected. According to the process of this invention, a permanent moving of the granulate is required only within the crystallization zone. However, since the crystallization requires less than 25% of the total reaction time required for solid state polycondensation, the effort required to keep the granulate in motion during the crystallization is negligible. Furthermore, residence time variations during crystallization are of only secondary importance since the subsequent solid state polycondensation has a compensating effect in the fixed bed.

According to a preferred embodiment of the process according to the invention, the crystallization is effected at a temperature of 230° C to 245° C and a density of 1.403 to 1.415 g/cm3. These preferred conditions produce a satisfactory reaction rate during the crystallization and prevents thermal degradation in the step of the process. The solid state polycondensation is preferably effected at a temperature of 230° C to 245° C, which results in an optimum reaction rate at the lowest possible degree of thermal degradation.

The process of the invention may be effected most advantageously if the polyethylene terephthalate serving as the starting material for the crystallization and the solid state polycondensation has a intrinsic viscosity of 0.4 and more. At lower intrinsic viscosities a relatively large amount of liberated glycol can accumulate in the inert gas cycle and, as a result, reduce the reaction rate.

High reaction rates are particularly noticeable when the starting material has an OH to COOH end group ratio of at least 1.5:1, and preferably 3:1 and higher.

Under the crystallization conditions of the present invention it is sufficient that the time of crystallization is about 0.5 to 3 hours, and preferably about 1 to 2 hours.

An inert gas serves to remove the undesirable reaction products from the solid state polycondensation reactor. Nitrogen is especially suitable for this purpose particularly because it contributes to the overall economy of the process because of its low price. Preferably, the inert gas is recycled for economic reasons. Preferably, the recycled nitrogen has a water content of less than 250 mg/kg $N_2$, an ethylene glycol content of less than 10 mg/kg $N_2$, an oxygen content of less than 10 mg/kg $N_2$, and an aldehyde content of less than 1 mg/kg $N_2$. When the indicated water content is exceeded, hydrolytic effects, undesirable for the polymer may occur. If the ethylene glycol content in the inert gas reaches excessive high values, the reaction rate will be unfavorably effected. Elevated oxygen and aldehyde levels are undesirable since they may cause discoloration of the end product.

To limit the regeneration costs of the recycle inert gas and to reduce the energy costs, the weight ratio of nitrogen to granulate, in the solid state polycondensation can be about 0.7:1 to 3:1 and preferably about 1:1 to 2:1.

DETAILED DESCRIPTION OF THE INVENTION

Further details of the present invention are illustrated in the following specific examples.

EXAMPLES 1-18

25 kg of polyester granulate having an intrinsic viscosity of 0.5, a grain size of 4 × 4 × 2 mm and an OH:COOH end group ratio of 6.3:1, were charged from a silo to a mixer equipped with agitating blades and jacket-heating. The granulate was heated in the continuously operating mixer to the temperatures values, $T_K$, as indicated in Table 1 and then crystallized in conjunction with a continuous nitrogen surge at a nitrogen to granulate weight ratio of 2:1. The crystallization times are also given in Table 1. The granulate was then continuously fed, under an airtight seal; to a vertical, jacket-heated, tubular reactor where it formed a fixed bed. Nitrogen at a weight ratio of nitrogen to granulate of 2:1 and at a temperature corresponding to the T-values indicated in Table 1, was passed in countercurrent flow through the fixed bed. After a solid state polycondensation time of 8 hours, the final granulate emerged from the tubular reactor and had the sticking or agglomeration characteristics summarized in Table 1.

TABLE 1

| Ex. No. | $t_K$ (h) | $t_F$ (h) | $T_K$ (° C) | $T_F$ (° C) | V (Nm) | Remarks |
|---|---|---|---|---|---|---|
| 1 | 2 | 8 | 180 | 230 | 2,5 | stickiness |
| 2 | 1 | 8 | 180 | 230 | 2,7 | stickiness |
| 3 | 2 | 8 | 180 | 235 | 2,8 | stickiness |
| 4 | 1 | 8 | 180 | 235 | 3,0 | stickiness |
| 5 | 2 | 8 | 180 | 240 | 5,0 | stickiness |
| 6 | 1 | 8 | 180 | 240 | 5,5 | stickiness |
| 7 | 3 | 8 | 220 | 235 | 2,7 | stickiness |

TABLE 1-continued

| Ex. No. | $t_K$ (h) | $t_F$ (h) | $T_K$ (° C) | $T_F$ (° C) | V (Nm) | Remarks |
|---|---|---|---|---|---|---|
| 8 | 1,5 | 8 | 220 | 235 | 3,0 | stickiness |
| 9 | 3 | 8 | 220 | 240 | 3,2 | stickiness |
| 10 | 1,5 | 8 | 220 | 240 | 3,6 | stickiness |
| 11 | 2 | 8 | 250 | 240 | 0,5 | no stickiness |
| 12 | 1 | 8 | 250 | 240 | 0,6 | no stickiness |
| 13 | 2 | 8 | 245 | 235 | 0,2 | no stickiness |
| 14 | 1 | 8 | 245 | 235 | 0,4 | no stickiness |
| 15 | 2 | 8 | 240 | 230 | 0,2 | no stickiness |
| 16 | 1 | 8 | 240 | 230 | 0,3 | no stickiness |
| 17 | 2 | 8 | 230 | 230 | 0,3 | no stickness |
| 18 | 1 | 8 | 230 | 230 | 0,4 | no stickness |

From the data set forth in Table 1, it is evident that in Examples 1 to 18 the crystallization time $t_K$ (h), the crystallization temperature $T_K$ (° C), and the solid state polycondensation temperature $T_F$ (° C) vary. The sticking characteristics V (Nm) given in Table 1 are relative values which were determined by a measuring apparatus specifically developed for this purpose. The development of such a measuring apparatus was necessary after a futile search for a commercially available, suitable instrument. The newly designed measuring apparatus determines the friction resistence and the stickiness of plastic granulates under the solid state polycondensation conditions by measuring relative torque values. The design of the measuring apparatus and its use will be described later by reference to the attached Figure. The intrinsic viscosity of the initial granulate was also determined at 25° C by dissolving 0.5 g of polyethylene terephthalate in 100 ml of 60:40 mixture of phenol/tetrachloroethane.

Table 1, also summarizes the results of comparative Examples 1-10 run at temperatures outside the temperature ranges of the present invention. These examples demonstrate that granulates free of stickiness cannot be obtained at crystallization temperatures $T_K$ below the elevated solid state polycondensation temperatures $T_F$. The results of the Examples 11 through 18 when compared to Example 1-10 reflect the surprising effect of the present invention, i.e., when the selected crystallization temperature $T_K$ was higher than, or equivalent to, the solid state polycondensation temperatures $T_F$, no stickiness was noticed. Large-scale production experience has shown that sticking characteristics of V less than 1 Nm are required to obtain a product exempt from stickiness and thus troublefree in the continuous solid state polycondensation operation. Sticking characteristics of $V = O$ cannot be realized even in the complete absence of sticking tendencies due to reasons inherent in the measuring apparatus. As a result, the sticking values V given in the examples 11-18 (0.2 to 0.6 Nm) are equivalent to a complete absence of stickiness.

EXAMPLES 19-26

Polyethylene terephthalate having the same initial characteristics as in Examples 1-18 was crystallized, using the apparatus described in the examples 1-18, at a temperature, $T_K$ of 235° C for a time, $t_K$, of 1.5 hours, the resultant crystallized product was then subjected to solid state polycondensation at a temperature, $T_F$, of 230° C for a period, $t_F$, of 8 hours. The weight ratio of nitrogen to granulate was varied according to the time set forth in Table 2 for example 19-26 in order to show the effect of the inert gas volume on the course of reaction and the tendency of the granulate to become sticky in the tubular reactor. The results obtained are summarized in the following Table 2.

TABLE 2

| Example No. | kg N$_2$ : kg PET | $\eta$intr.E | $\Delta$T (°C) |
|---|---|---|---|
| 19 | 0.3 : 1 | 0.72 | 5 |
| 20 | 0.5 : 1 | 0.83 | 4 |
| 21 | 0.7 : 1 | 0.90 | 2 |
| 22 | 1   : 1 | 0.94 | 2 |
| 23 | 2   : 1 | 0.98 | 1 |
| 24 | 3   : 1 | 1.0  | 1 |
| 25 | 4   : 1 | 1.01 | 1 |
| 26 | 5   : 1 | 1.01 | 1 |

In Examples 19-26, not a single example exhibited sticking of the granulate in the tubular reactor. In each example, a uniform flow was obtained in the tubular reactor as evidenced by the temperature measurements across the cross section of the tubular reactor. The temperature differences $\Delta$T across the reactor are set forth in the last column of Table 2. The difference in the temperature gradients $\Delta$T are explained by the different recycle ratio of nitrogen to granulate. If agglomerations due to stickiness had occurred, the temperature gradient $\Delta$T would have had to be substantially higher and in the order of magnitude of 10° C and more. In addition, the examples 19-26 demonstrate that a substantial increase of the final viscosity $\eta$intr.E can be obtained only with a weight ratio of nitrogen to granulate of more than 0.7:1. Increasing this weight ratio to values of over 3:1 entailed no significant improvement. A raising of the weight ratio would also involve an increase of the recycle gas volume and, as a result, higher energy consumption rates.

EXAMPLES 27-32

The Examples 27-32, summarized in the following Table 3, were tests run using the same apparatus described with respect to Examples 1-18 to illustrate the dependence of the density (g/cm3) of the polyethylene terephthalate granulate upon the crystallization time, $t_K$, and the crystallization temperature, $T_K$. For each of the Examples 27-32 and for every crystallization period selected, five crystallization tests were run at different crystallization temperatures.

TABLE 3

| Ex. No. | $t_K/T_K$ (h) (°C) | 220 | 230 | 240 | 250 | 260 |
|---|---|---|---|---|---|---|
| 27 | 0.5 | 1.390 | 1.395 | 1.402 | 1.403 | 1.403 |
| 28 | 1   | 1.395 | 1.400 | 1.405 | 1.409 | 1.408 |
| 29 | 1.5 | 1.398 | 1.402 | 1.406 | 1.412 | 1.410 |
| 30 | 2   | 1.400 | 1.405 | 1.408 | 1.414 | 1.410 |
| 31 | 3   | 1.401 | 1.407 | 1.411 | 1.416 | 1.411 |
| 32 | 4   | 1.401 | 1.408 | 1.412 | 1.416 | 1.410 |

From Table 3, it is evident that the selected crystallization time periods and the crystallization temperatures remain within the limits set according to the invention. The density values of the polyethylene terephthalate granulate obtained by crystallization allow, in each single case, a solid state polycondensation under the conditions of the invention without any sign of stickiness being found.

EXAMPLES 33-40

In a further series of tests, the effect of various contaminates in the inert gas on the polycondensation reaction was examined after it had been previously discovered that even at low weight ratios of nitrogen to granulate no agglomerations occurred. Table 4, summarizes the results obtained in Examples 33-40 using the apparatus described in Examples 1-18. The polyethylene terephthalate granulate feedstock had an initial viscosity of 0.58. The crystallization time was 1.5 hours at a temperature of 230° C. The granulate was polycondensed for 6 hours at 230° C in the tubular reactor. In the various tests the inert gas was enriched with different volumes of H$_2$O and ethylene glycol.

TABLE 4

| Example No. | Ethylene Glycol (mg/kg N$_2$) | H$_2$O (mg/kg N$_2$) | $\eta$intr.E |
|---|---|---|---|
| 33 | 0  | 62  | 1.05 |
| 34 | 12 | 41  | 1.03 |
| 35 | 28 | 41  | 0.98 |
| 36 | 53 | 48  | 0.92 |
| 37 | 10 | 102 | 1.01 |
| 38 | 19 | 245 | 0.98 |
| 39 | 15 | 319 | 0.94 |
| 40 | 21 | 464 | 0.89 |

From the data set forth in Table 4, it is evident that an increase of the ethylene glycol in the recycle inert gas lowers the final viscosity $\eta_{intr.E}$. This data also demonstrates that a reduced water content in the recycle inert gas stream has a negligible effect on the final viscosity $\eta_{intr.E}$. An increase in the water content to more than about 250 mg/kg N$_2$ in the inert gas stream, however, has an effect on the course of reaction since the final viscosities were reduced (Examples 38-40).

EXAMPLES 41-44

In order to examine the effect of an oxygen content in the recycle inert gas on the granulate, four tests were conducted by adding different quantities of O$_2$ under otherwise the same conditions as in the Example 33. The nitrogen had an initial O$_2$ content of 4 to 5 mg/kg N$_2$. The results obtained are summarized in Table 5.

TABLE 5

| Example No. | O$_2$ (mg/kg N$_2$) | Ethylene Glycol (mg/kg N$_2$) | H$_2$O (mg/kg N$_2$) | $\eta$intr.E | Yellowness index (ASTM D1925) |
|---|---|---|---|---|---|
| 41 | 4 - 5   | 0 | 62 | 1.04 | 4  |
| 42 | 9 - 10  | 0 | 62 | 1.04 | 5  |
| 43 | 14 - 15 | 0 | 62 | 1.02 | 8  |
| 44 | 24 - 25 | 0 | 62 | 1.00 | 14 |

From the data set forth in Table 5, it is evident that with O$_2$ concentrations of greater than 10 mg/kg N$_2$ in the inert gas, severe deterioration of color in the granulate occurs. On the other hand, there is an immaterial reduction in the final viscosity of the granulate during the solid state polycondensation.

EXAMPLES 45-50

In a further series of examples, the effect of the solid state polycondensation temperature $T_F$ in the tubular reactor upon the attainable final viscosity $\eta_{intr.E}$ was investigated again using the same apparatus as in Examples 1-18. The initial viscosity of the granulate was 0.67. The granulate dimensions were 4 × 2 × 2 mn. The crystallization temperature $T_K$ was always selected to conform to the polycondensation temperature $T_F$. The crystallization lasted 1.5 hours. The solid state polycondensation time was 6 hours. The nitrogen was not recycled.

TABLE 6

| Example No. | 45 | 46 | 47 | 48 | 49 | 50 |
|---|---|---|---|---|---|---|
| $T_F$(° C) | 200 | 210 | 220 | 230 | 240 | 250 |
| $\eta$intr.E | 0.74 | 0.81 | 0.83 | 0.95 | 1.02 | 1.14 |

From the test results summarized in Table 6, it is evident that a solid state polycondensation temperature $T_F$ of over 220° C must be selected with a constant solid state polycondensation time in order to obtain a final viscosity $\eta_{intr.E}$ of greater than 0.9.

EXAMPLES 51-57

In Examples 51-57 the results of which are summarized in Table 7, the effect of the OH to COOH end group ratio, in that starting material upon the solid state polycondensation reaction was examined using the apparatus described in connection with the Examples 1-18. The crystallization temperature was 245° C. The solid state polycondensation temperature was 240° C. The crystallization lasted 1.5 hours and the solid state polycondensation 6 hours. In the following Table 7, the initial viscosity is indicated by $\eta_{nitro.O}$.

TABLE 7

| Example No. | intro.O | OH (meq/kg) | COOH (meq/kg) | OH:COOH | intr.E |
|---|---|---|---|---|---|
| 51 | 0.50 | 113.0 | 11.3 | 10.00:1 | 1.12 |
| 52 | 0.57 | 90.0 | 13.9 | 6.47:1 | 1.08 |
| 53 | 0.62 | 80.5 | 12.7 | 6.34:1 | 1.08 |
| 54 | 0.62 | 69.1 | 22.9 | 3.02:1 | 1.08 |
| 55 | 0.59 | 66.9 | 28.1 | 2.38:1 | 0.99 |
| 56 | 0.57 | 60.6 | 40.1 | 1.51:1 | 0.94 |
| 57 | 0.61 | 50.6 | 41.4 | 1.22:1 | 0.87 |

From the test results set forth in Table 7, it is clearly evident that, with OH to COOH end group ratios of over 3:1 in the starting material and with otherwise substantially the same initial viscosities and reaction conditions, higher final viscosities are obtained in the polyethylene terephthalate granulate.

Description of Apparatus Used to Measure Granulate Stickiness

The apparatus for determining the relative sticking characteristics, V, as mentioned in Examples 1-18 is illustrated in the schematic diagrams of the unit. Referring to the Figure, the measuring flask comprises a stainless steel vessel 10 surrounded by a heating jacket 11 to which a heating medium such as recycle oil enters through the pipe connections 11a and 11b. The temperature of the heating medium may be set by a thermostat-controlled heating device 12. The heating jacket 11 is coated with an insulating envelope 13 indicated by a broken line in the Figure.

An agitating device 14 equipped with several extensions 15 protruding from the rotation axis is positioned coaxially within vessel 10. The agitating device 14 is attached to the lower end of a driving shaft 16 which leads upwards to a driving motor 17. The housing of motor 17 is pivotally suspended and connected with a recording or plotting device 18 comprising a lever arm 18a with a recording pen 18b and a recording roll 18c. The driving shaft 16 is connected with the driving motor 17 by a disengaging clutch 19 in order to be able to reset the agitating device 14 into a no-load condition in an axial direction after each measurement. A stationary, circular, disk-shaped wall element 20 having openings therein is positioned in the lower part of vessel 10. Positioned above, and parallel to wall element 20 is a second, vertical mobile wall element 21 having substantially the same dimensions as wall element 20. Driving shaft 16 passes through wall element 21 so that the agitating device 14 is placed between the two wall elements 20 and 21. The upper mobile wall element 21 rests against a hollow strut 22 which coaxially surrounds the driving shaft 16. The upper end of hollow strut 22 is connected by joint 23 with lever arm 24 which is variably loadable through a horizontally displaceable weight 25. The lever arm 24 has a fulcrum 26 which is vertically adjustable by means of an operating screw 27. An indicating device 28 comprising a pointer 28a and a scale 28b serves to determine the horizontal alignment of the lever arm. By means of the operating screw 27, it is possible to align the lever arm 24, depending upon the bulk material volume, horizontally between the wall elements 20 and 21. The distance between the wall elements 20 and 21 coincides with the layer height and may be read on the indicating device 28. The transfer of force from the lever arm 24 to the mobile wall element 21 is effected via the hollow strut 22 in conformity with the principle of leverage. An adjustable guide 29 is attached to the free end of the lever arm 24.

Below the lower wall element 20, there is a packing 30 of, for instance, glass rings to ensure a uniform temperature distribution across the whole cross section of the vessel 10. A temperature feeler 31 is introduced in this packing to measure the process temperature. Between the wall elements 20 and 21, there is a bulk material layer 32 of the granulate to be analyzed. In the marginal zone of this packing, a number of baffle plates 33 are positioned on the periphery in order to prevent a rotation of the packing. A temperature feeler 34 extends through the wall element 21 into this packing. Above the upper wall element 21, there is another packing 35 of the same granulate to be analyzed. Finally on top of this granulate there is a packing 36 of glass wool for reducing heat losses and preventing the ingress of atmospheric oxygen.

A gas source 37 is positioned upstream of vessel 10 for feeding, for instance, nitrogen to the vessel. The gas volume passed to the vessel is measured by a flow meter 38, by way of example, a rotameter. The gas flows then into a gas heater 39 comprising a horizontal cyclinder 40 and a heating element 41. The gas temperature is controlled by means of a temperature sensor 42 and an output regulator 43 for the heating element 41.

As a result of positioning the extensions 14 on agitating device 14 at an angle of 120 degrees to one another as well as being positioned on different heights, the granulate particles are forced to move at the beginning of each measurement and after approximately 0.3 revolutions of the agitating device. After one full revolution, almost all of the granulate particles have moved relative to one another. Any previously existing agglomeration will be largely removed after one revolution so that the remaining torque is due only to the friction of the granulate particles against each other and against the surface of the agitator. The stickiness between the granulate particles was measured by using the above described apparatus as follows. 850 g of polyethylene terephthalate granulate used for a measurement were placed in the apparatus and wall element 21 was placed on top of the granulate. After the glass wool was put in place and the hollow strut 22 slipped on, the lever arm 24 was positioned. The lever arm 24 was loaded with a weight 25 to 80 kp to eqaul a static pressure (at the bottom) of polyethylene terephthalate having a granulate height of 7.1 m. The cross-sectional area of the granulate in layer 32 was 122 cm². The loading of 80 kp remained the same for all tests according to Examples 1-18. The height of layer 32 was determined by means of indicating device 28. The recording device 18 was set to zero and the lever arm 18a was loaded with a tension spring acting in its longitudinal direction (not shown). The size of the tension spring was selected in accordance with the expected torque. Springs were used with an elongation of 28 mm, 50 mm and 118 mm for each kp tensile strength. The lever arm 18a had a length of 28 cm. the disengaging clutch 19, was tightened and the first measurement was taken at room temperature (25° C).

When measurements were taken, the motor 17 and the recording device 18 were actuated at the same time. The agitator speed was set at 2 rpm. The paper advance was adjusted to 26 cm/min. The clutch 19 was then disengaged and a gas stream of 6 Nm3 $N_2$/h was set. The heating device 12 was connected and the relevant thermostat adjusted to an oil temperature at which the measurements of friction resistance and the stickiness were taken. The $N_2$-heater was connected and a predetermined temperature was set on the temperature sensor 42 and which could be reached on the temperature sensors 31 and 34 within approximately 40 minutes. This predetermined temperature was not to be exceeded on temperature sensor 31 by more than 1° C. The temperature of the temperature sensor 42 as a result was higher by about 7°-15° C than that of the temperature sensor 31. After taking the last measurement, the temperture was lowered to less than 200° C, and all the heating elements and $N_2$-supply disconnected. Upon removal of the glass wool and the other component parts of the measuring apparatus, and after the cooling of the granulate to room temperature, the granulate was withdrawn and its intrinsic viscosity and density were determined on a representative sample.

The torque plottings recorded by the recording or plotting device 18 were then used to determine the stickiness of V-characteristics of the granulate. The plottings set forth torque curves at a distance from the abscissa proportional to the effective torque at the agitator. The number of revolutions of the agitator were selected as the abscissa since this best reflects how the stickiness of the granulates to be measured depends upon their movement during the measurement. The speed of the agitator and the time of the measurement played only a secondary part in the measurement. The V-characteristics concern relative values, i.e., torques expressed in Nm which correspond to the sticking component. The absolute values of the V-characteristics still depend of course on the geometry of the measuring apparatus and, in particular, on the number of and the size of the pins on the measuring agitator. The V-characteristic illustrates the 'intensity' or the 'power' of the stickiness at elevated temperatures and, in particular, the temperature at which the solid state polycondensation is conducted. As set forth, the number of revolutions of the agitating device were plotted on the abscissa and the relevant torques were recorded in Nm on the ordinate. The curves have a characteristic course, namely a high torque at the beginning of the measurement, i.e., during the 'breaking' of possible existing agglomerations, and followed by subsequent lower torque.

For purposes of evaluation, the peaks of the plotted curves were connected with one another. A straight line was then drawn parallel to the abscissa through the obtained curve so that the sectional areas above and below the straight line were, as much as possible, of equal size. In this way, an average of the peaks is obtained which is mainly the result of the friction and is called for short the R-characteristic.

In addition, a second straight line is drawn parallel to the abscissa analogous to the initially occurring higher peaks. In this way, an average is obtained, but a curve section of a different size must be taken into account depending on the formation of the peaks. This curve section is in practice generally within the limit of 0.3 to 1.1 revolutions of the agitating device. The R-characteristic is exceeded at a correspondingly high temperature. This is attributed to the stickiness of the bulk material. The difference between the two straight lines drawn through the different peaks is denoted as the so-called V-characteristic. The V-characteristic primarily represents the intensity or the power of stickiness of the granulate.

We claim as our Invention:

1. A process for the continuous production of high molecular weight polyethylene terephthalate by polycondensation in the solid phase from a dried, granulated polyethylene terephthalate, having an intrinsic viscosity of at least 0.15, which comprises crystallizing the granulate to a density of at least 1.390 g/cm3 under forced motion at a temperature of 220° C to 260° C under an inert gas atmosphere, passing the crystallized granulate at a constant or reduced temperature to a continuous fixed bed reactor, and, continuously polycondensing the crystallized granulate in said reactor while in contact with an inert gas stream at a temperature equivalent to, or lower than, the crystallization temperature.

2. A process according to claim 1, wherein the crystallization temperature is 230° C to 245° C and the granulate is crystallized to a density of 1.403 to 1.415 g/cm3.

3. A process according to claim 1, wherein the solid state polycondensation temperature is 230° C to 245° C.

4. A process according to claim 1, wherein the granulated polyethylene terephthalate has an intrinsic viscosity of at least 0.4.

5. A process according to claim 1, wherein the granulate material has a OH to COOH end group ratio of at least 1.5:1.

6. A process according to claim 5, wherein the end group ratio is at least 3:1.

7. A process according to claim 1, wherein the crystallization time is 0.5 to 3 hours.

8. A process according to claim 7, wherein the crystallization time is 1 to 2 hours.

9. A process according to claim 1, wherein an inert gas removes reaction products from the solid state polycondensation reactor.

10. A process according to claim 9, wherein said inert gas is nitrogen.

11. A process according to claim 9, wherein the nitrogen has a water content of less than 250 mg/kg $N_2$, an ethylene glycol content of less than 10 mg/kg $N_2$, an oxygen content of less than 10 mg/kg $N_2$ and an aldehyde content of less than 1 mg/kg $N_2$.

12. A process according to claim 10, wherein the weight ratio of nitrogen to crystallized granulate, in the solid state polycondensation is 0.7:1 to 3:1.

13. A process according to claim 12, wherein said nitrogen to granulate ratio is 1:1 to 2:1.

* * * * *

REEXAMINATION CERTIFICATE (2113th)
United States Patent [19]
Rothe et al.

[11] B1 4,064,112

[45] Certificate Issued    Oct. 26, 1993

[54] PROCESS FOR THE CONTINUOUS PRODUCTION OF HIGH MOLECULAR WEIGHT POLYETHYLENE TEREPHALATE

[75] Inventors: Hans J. Rothe, Maintal; Helmut Heinze, Frankfurt; Brian D. Whitehead, Friedrichsdorf; Gunther Priepke, Nidderau, all of Fed. Rep. of Germany

[73] Assignee: Zimmer Aktiengesellschaft, Fed. Rep. of Germany

Reexamination Requests:
No. 90/002,649, Feb. 18, 1992
No. 90/002,977, Mar. 2, 1993

Reexamination Certificate for:
Patent No.: 4,064,112
Issued: Apr. 15, 1976
Appl. No.: 677,503
Filed: Dec. 20, 1977

[30] Foreign Application Priority Data

Dec. 31, 1975 [DE] Fed. Rep. of Germany ....... 2559290

[51] Int. Cl.$^5$ ............................................. C08G 63/80
[52] U.S. Cl. ................................................. 528/272
[58] Field of Search ................... 528/272, 308.1, 308.3

[56] References Cited

U.S. PATENT DOCUMENTS

| | | | |
|---|---|---|---|
| 3,075,952 | 1/1963 | Coover et al | 528/279 |
| 3,405,098 | 10/1968 | Heighton et al | 528/308.5 |
| 3,728,309 | 4/1973 | Maxion | 528/481 |
| 3,756,990 | 9/1973 | Jaeger et al | 528/481 |
| 3,969,324 | 7/1976 | Berkau et al | 526/65 |

FOREIGN PATENT DOCUMENTS

1,251,093 10/1971 GB Hoechst .
1,277,810 6/1972 GB Hoechst .

OTHER PUBLICATIONS

Antwerpen et al "Influence of Crystallization Temperature, Molecular Weight, and Additives on the Crystallization Kinetics of Polyethylene Terephthalate"

Chen et al "Thermally Induced Solid State Polycondensation of Nylon 66, Nylon 6–10 and Polyethylene Terephthalate", AICHE J. 9/1969; pp 680–685

Chang et al "Solid State Polymerization of Polyethylene Terephthalate" J. q Appl. Sc. Vol. 28, 3289–3300 (1983)

Cobbs, Jr., et al "Crystallization of Polyethylene Terephthalate", J. Polymer Sc. Vol. 3. pp 275–290

*Primary Examiner*—Harold D. Anderson

[57] ABSTRACT

This invention relates to a process for the continuous production of high molecular weight polyethylene terephthalate by polycondensation in the solid phase wherein granulated, dried polyethylene terphthalate, having an intrinsic viscosity of at least 0.15, is first crystallized and is thereafter subjected to solid state polycondensation.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-13 is confirmed.

* * * * *

REEXAMINATION CERTIFICATE (2382nd)

United States Patent [19]
Rothe et al.

[11] B2 4,064,112
[45] Certificate Issued  Sep. 13, 1994

[54] PROCESS FOR THE CONTINUOUS PRODUCTION OF HIGH MOLECULAR WEIGHT POLYETHYLENE TEREPHTHALATE

[75] Inventors: Hans J. Rothe, Maintal; Helmut Heinze, Frankfurt; Brian D. Whitehead, Friedrichsdorf; Gunther Priepke, Nidderau, all of Fed. Rep. of Germany

[73] Assignee: Davy McKee Aktiengesellschaft, Frankfort, Fed. Rep. of Germany

Reexamination Request:
No. 90/003,223, Oct. 15, 1993

Reexamination Certificate for:
Patent No.: 4,064,112
Issued: Dec. 20, 1977
Appl. No.: 677,503
Filed: Apr. 15, 1976

[30] Foreign Application Priority Data
Dec. 31, 1975 [DE] Fed. Rep. of Germany ....... 2559290

[51] Int. Cl.$^5$ .............................................. C08G 63/80
[52] U.S. Cl. ................................. 528/272; 528/272; 528/308.1; 528/308.3; 528/481; 528/503
[58] Field of Search ................. 528/272, 308.1, 308.3, 528/481, 503

[56] References Cited

U.S. PATENT DOCUMENTS

| | | | |
|---|---|---|---|
| 3,816,377 | 6/1974 | Okuzumi | 528/275 |
| 3,969,324 | 7/1976 | Berkau et al. | 526/65 |
| 4,008,206 | 2/1977 | Chipman et al. | 525/437 |
| 4,069,194 | 1/1978 | Gey et al. | 523/219 |

FOREIGN PATENT DOCUMENTS

1251093  10/1971  United Kingdom .

*Primary Examiner*—Sam A. Acquah

[57] ABSTRACT

This invention relates to a process for the continuous production of high molecular weight polyethylene terephthalate by polycondensation in the solid phase wherein granulated, dried polyethylene terphthalate, having an intrinsic viscosity of at least 0.15, is first crystallized and is thereafter subjected to solid state polycondensation.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-12 and 13 is confirmed.

* * * * *